United States Patent [19]

Johnston et al.

[11] Patent Number: 4,924,981
[45] Date of Patent: May 15, 1990

[54] OVERRUNNING ROLLER CLUTCH WITH IMPROVED SHIPPING RETENTION

[75] Inventors: Albert D. Johnston, Huron; Frederick E. Lederman, Sandusky, both of Ohio

[73] Assignee: General Motors Corporation, Detroit, Mich.

[21] Appl. No.: 397,924

[22] Filed: Aug. 24, 1989

[51] Int. Cl.5 .............................................. F16D 41/06
[52] U.S. Cl. ..................................... 192/45; 192/41 R
[58] Field of Search .................... 192/45, 44, 41 R; 188/82.84

[56] References Cited

U.S. PATENT DOCUMENTS 4,712,661 12/1987 Lederman et al. .................... 192/45
4,821,856 4/1989 Lederman ............................. 192/45

FOREIGN PATENT DOCUMENTS 1213177 3/1966 Fed. Rep. of Germany ... 188/82.84

OTHER PUBLICATIONS

Application No. 402,303, filed Sep. 5, 1989, Shows Clutch Cage and Car Features.

Primary Examiner—Rodney H. Bonck
Assistant Examiner—Andrea Pitts
Attorney, Agent, or Firm—Patrick M. Griffin

[57] ABSTRACT

Roller control cars are securely retained to a cage by using the crush length of the roller energizing springs to prevent guide tabs of the cars from backing out of guide tracks on the cage.

3 Claims, 2 Drawing Sheets

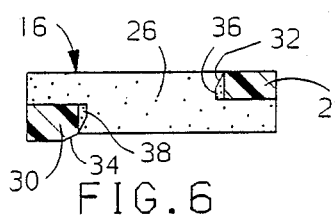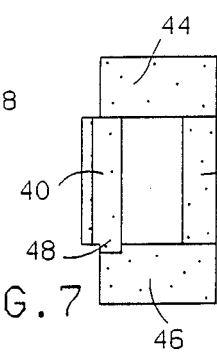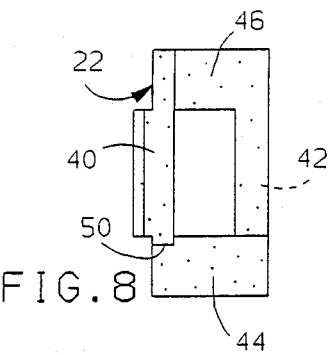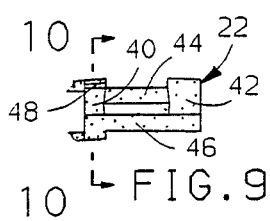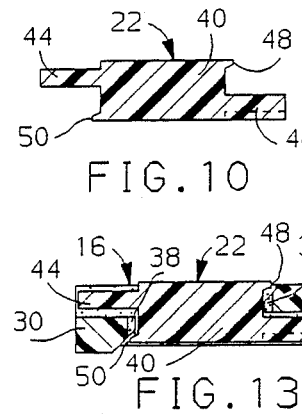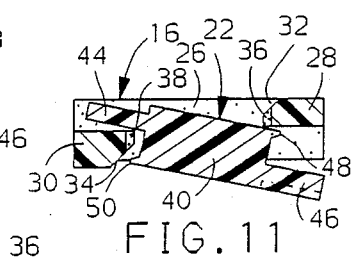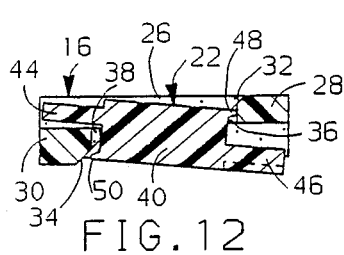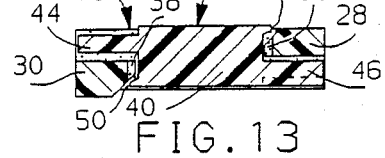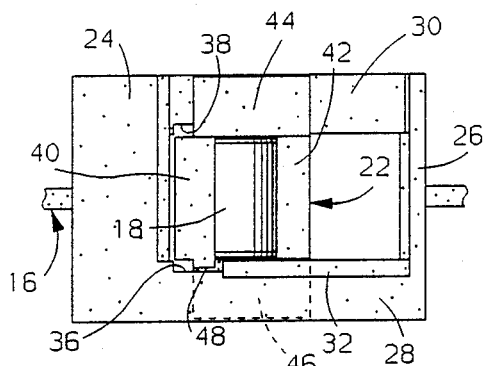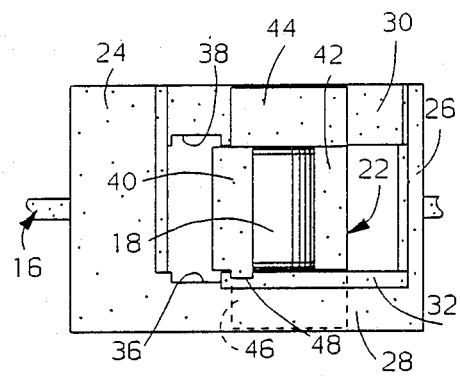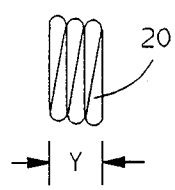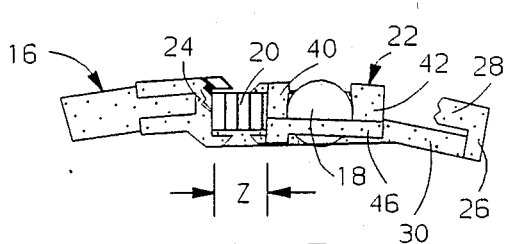

OVERRUNNING ROLLER CLUTCH WITH IMPROVED SHIPPING RETENTION

This invention relates to overrunning roller clutches in general, and specifically to such a roller clutch in which conventional roller energizing springs can be used create a secure roller shipping retention independently of the resilience of the spring.

BACKGROUND OF THE INVENTION

The basic components of an overrunning roller clutch include a cage, a plurality of cylindrical rollers, and a matching plurality of roller energizing springs. Roller clutches, especially those installed in an assembly line process, generally experience a fair amount of shaking during shipping and handling, before they are installed between a cam race and a pathway race. It is important that the components be retained together as a unit during shipping, for ease of handling and installation. Shipping retention is most difficult for the rollers, since they are heavy, cylindrical and smooth, and since any shipping retention structure must not be allowed to hinder the circumferential travel of the roller between the races after installation.

The conventional approach is to rely on the resilience of the springs to press the rollers against roller rest su faces on the cage prior to installation. This requires no change in the basic shape of the spring or cage, since the front leaves of the springs generally are curved to conform to the rollers anyway, and a cross bar or other part of the cage can easily be modified to provide a roller conforming rest surface. Nor is there any impingement upon the ability of the roller to travel, since installation is generally done by a pushing and simultaneous twisting action of the pathway race, called "ringing in." All of the rollers are shifted away from the roller rest surfaces of the cage, compressing the springs at the same time. The rollers never again touch the roller rest surfaces of the cage after clutch installation. The great problem with the old approach is that it is not particularly positive or secure. The energizing springs are not highly resilient, nor should they be, and so they cannot hold the rollers with a great deal of security. The rollers can easily be shaken loose, and such clutches have to be carefully handled.

An alternative roller shipping retention scheme which is not totally independent of the energizing springs, but is at least independent of the resilience of the energizing springs, is shown in U.S. Pat. No. 3,942,616 to Elmore. Axially opposed pairs of tabs are lanced inwardly from the metal side rails of the cage, and extend into hollowed out ends of the rollers. The tabs are used as the energizing springs for the rollers, and to retain the rollers to the clutch. While the rollers are retained securely, roller travel is severely limited, to less than the diameter of the rollers at most. Furthermore, the short tabs cannot provide enough resilience to allow the rollers to travel over a path even as large as the diameter of the depression in the end of the roller. Consequently, a densely packed complement of short traveling is necessary, which is impractical for most applications.

Another roller shipping retention scheme that is independent of the resilience of the spring, but which does not adversely affect roller travel, is disclosed in U.S. Pat. No. 4,724,940 to Lederman, assigned to the assignee of the current invention. Specially designed springs with latch portions are securely interfitted with latch members on the cage to trap the rollers against roller rest surfaces on the cage prior to clutch installation. The roller shifting action of the ringing in installation method is used to release the latch members, and the rollers and springs perform without restriction thereafter. The springs are not conventional, however, and a certain amount of give must be built into either the cage side rails, the springs, or both, to allow for latch disengagement during installation.

Recent advances in roller clutch design by the assignee of the subject invention have provided yet another roller shipping retention scheme, one that is totally independent of the spring in every sense, but which is dependent on the roller shifting action of the ringing in installation method. A roller control car contains each roller, sliding back and forth between the cage side rails with the roller as the roller travels. Before installation, a releasable latch securely holds the car and its roller to the cage in a shipping position removed from the eventual position of the car and roller after installation. During ringing in, the shift of the rollers shifts the cars as well, and releases the latches, freeing the rollers and their cars for unhindered travel. How strongly the roller is retained to the cage during shipping depends only on the strength of the latch, and the spring need not even be present during shipping. While the roller car with latch provides a very secure retention, assembly does require that each car latch member be pop fitted into its respective cage latch member with a fair degree of precision, to assure thorough and complete latching. Furthermore, during the ringing in of the pathway race, the simultaneous, or near simultaneous, disengagement of a plurality of strongly engaged latching members inevitably requires some extra torque, and can disturb the smoothness of the installation operation, not in terms of final result, but in terms of sound and feel.

SUMMARY OF THE INVENTION

The overrunning clutch of the invention retains a plurality of roller cars to a one piece cage without releasable latches of any kind. The energizing springs are instrumental to the retention of the cars to the cage, but their resilience is not involved.

In the embodiment disclosed, the energizing springs are basically conventional, and continually bias the rollers during clutch operation, albeit indirectly, by biasing the roller containing cars. The springs need have no particular strength in terms of resilience, but each must have a crush length beyond which it cannot be compressed except by a crush force that is greater than the disturbing forces the roller will likely experience during normal shipping and handling. The cage, which is molded in one piece of plastic, has a plurality of generally box shaped pockets formed by a journal block and cross bar joined together by a pair of parallel, circumferentially extending side rails. Each roller travels between a pair of side rails during clutch operation. The journal blocks also serve as spring foundation members, that is, the part of the cage from which each spring acts. Each pair of side rails includes a pair of guide tracks disposed generally along the roller travel path and a pair of widened entrance slots opening into the guide tracks. The entrance slots are spaced from the journal block by a slot distance that is less than the spring crush length.

Each car has a pair of axially opposed guide tabs that fit slidably within the side rail guide tracks, but which fit with clearance through the entrance slots. The guide tabs are spaced from the front of the roller car by substantially the slot distance. Before the spring is added, the guide tabs of each car may be aligned with a respective guide track as they clear the entrance slots. The car is then moved back far enough that the guide tabs enter the guide tracks, which requires essentially no force or accurate positioning. Finally, an energizing spring is installed between each journal block and the front of each roller car. Since the disturbing forces that the roller sees cannot push the spring past its crush length, the guide tabs cannot thereafter reach the entrance slots, and so are trapped in the guide tracks. The rollers and cars are securely retained to the cage, totally independently of spring resilience. The ringing in installation is totally unaffected, and, after installation, the rollers travel freely as the guide tabs slide in the guide tracks.

It is, therefor, a general object of the invention to provide a new way of using the energizing springs to create secure roller shipping retention in a roller clutch.

It is another object of the invention to provide a new way of retaining a roller car to a cage that does not depend upon latches released by the shifting action of the rollers that occurs when the clutch is installed.

It is another object of the invention to so retain the roller by using the resistance of the springs to being crushed, as opposed to their resilience, so as to prevent guide tabs on the car from backing out of guide tracks on the cage.

DESCRIPTION OF THE PREFERRED EMBODIMENT

These and other objects and features of the invention will appear from the following written description, and from the drawings, in which:

FIG. 6 is a sectional view of a cage pocket taken along the line 6—6 of FIG. 4;

FIG. 7 is a top plan view of a preferred embodiment of an empty roller control car;

FIG. 8 is a bottom plan view of an empty roller control car;

FIG. 9 is a side view of an empty roller control car;

FIG. 10 is a sectional view taken along the line 10—10 of FIG. 9;

FIG. 11 is a view of a car and cage, as shown in FIGS. 10 and 6, being assembled together as the car is initially fitted between the cage side rails;

FIG. 12 is a view like FIG. 11, with the car moved farther in between the side rails;

FIG. 13 is view like FIG. 11, but with the car moved completely between the side rails;

FIG. 14 is a top plan view of a car and cage pocket after the car is between the side rails, but before the car guide tabs have been shifted back into the side rail guide slots;

FIG. 15 is a view like 14, after the car guide tabs have been shifted back into the side rail guide slots, but before the spring has been added;

FIG. 16 is a view of a spring alone, showing its crush length;

FIG. 17 is a side view of a cage pocket and car, with part of a side rail broken away to better show the car and spring, and showing the spring at its crush length, to illustrate how it prevents the car guide tabs from exiting the side rail guide tracks.

Figure 1:
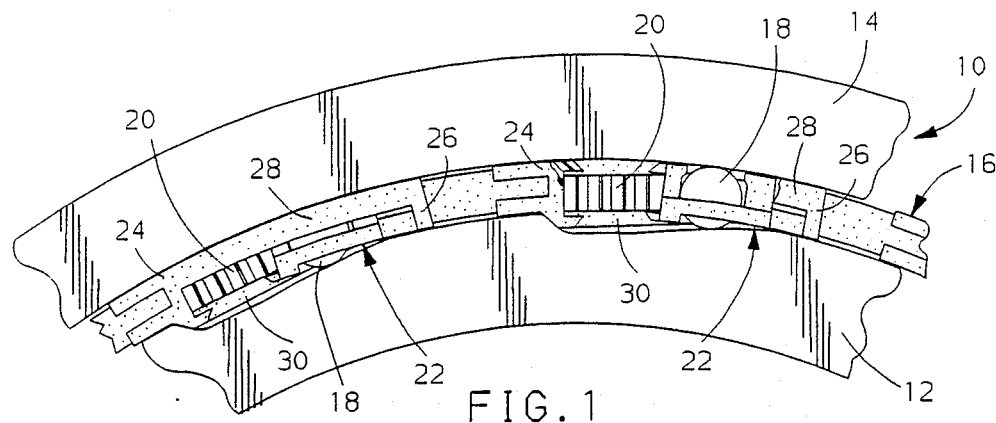
FIG. 1 is an end view of a portion of a preferred embodiment of the overrunning roller clutch of the invention after installation, with part of the upper cage side rail broken away.
Figure 2:
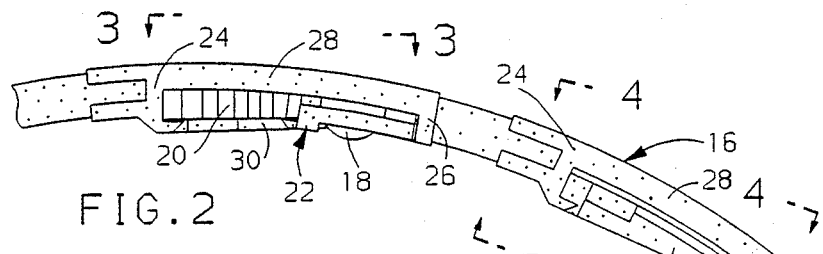
FIG. 2 is a portion of the clutch prior to installation, and showing one pocket empty.
Figure 3:
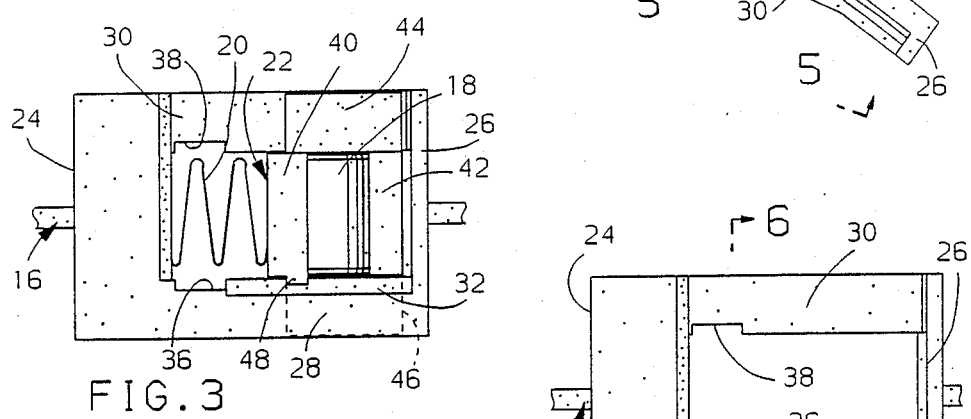
FIG. 3 is a view of a filled roller pocket taken along the line 3—3 of FIG. 2.
Figure 4:
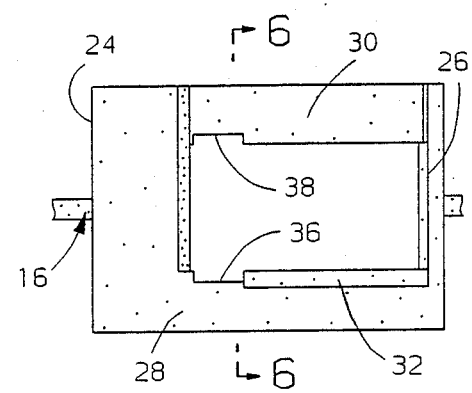
FIG. 4 is a view of an empty roller pocket taken along the line 4—4 of FIG. 2.

Referring first to FIGS. 1 and 2, a preferred embodiment of the overrunning roller clutch of the invention, designated generally at 10, is adapted to be installed between an inner cam race 12 and an outer, coaxially disposed pathway race 14. The basic components of clutch 10 include a cage, designated generally at 16, a plurality of cylindrical steel rollers 18, an equal plurality of energizing springs 20, and an equal plurality of roller control cars, designated generally at 22. Clutch 10 is installed by the traditional "ringing in," method, where the clutch cage 16 is first pushed axially onto the cam race 12, which holds it non-turnably in a fixed orientation. Then, the pathway race 14 is pushed axially over the outer surface of the rollers 18, with the aid of a lead in chamfer, and simultaneously twisted counterclockwise a few degrees, shifting the rollers 18 counterclockwise at the same time.

Figure 5:
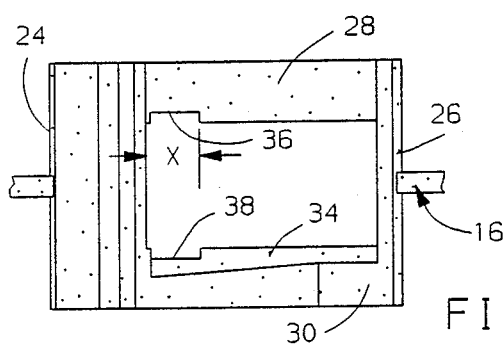
FIG. 5 is a view of an empty roller pocket taken along the line 5—5 of FIG. 2.

Referring next to FIGS. 2 through 6, cage 16 is molded in one piece of a suitable plastic by the technique generally called by pass molding. In by pass molding, a single pair of axially parting mold halves can mold a structure that is one piece, but still fairly complex. Cage 16 consists of a plurality of identical rectangular pockets, each of which is made up of an axially disposed journal block 24 and parallel cross bar 26 joined by a pair of circumferentially extending side rails, including an upper side rail 28 and a parallel, lower side rail 30. The side rails 28 and 30 of each pair do not lie on the same radius, so that they will have no radial overlap. Stated differently, the radial thickness of each side rail 28 and 30 is slightly less than half of the total radial separation between the races 12 and 14. Upper side rail 28 is generally arcuate and concentric to the coaxis of the clutch races 12 and 14, so its various edges are disposed generally along the travel path of a roller 18. This is not true for the lower edges of the lower side rails 30, however, as they have a saw tooth configuration. The inner surfaces of each of the side rail pairs 28 and 30 are axially spaced apart by just slightly more than the length of a roller 18. The ends of each roller 18 can therefore slide along the inner surfaces of a respective side rails 28 and 30 as clutch 10 operates, moving toward and away from a journal block 24 without binding. Each side rail 28 and 30 also includes a guide track, 32 and 34 respectively. While the guide tracks 32 and 34 are generally parallel, they are not directly axially opposed, because the side rails 28 and 30 are not axially opposed. The upper guide track 32 can be molded as a simple chamfer along the arcuate upper inner edge of the cage upper side rail 28, since side rail 28 is already disposed along the roller 18 travel path. The lower guide track 34, which is molded into the non arcuate, lower inside edge of lower side rail 30, must be molded with a more complex shape in order to dispose it along the roller 18 travel path. The inner surfaces of the side rails 28 and 30 are also molded with angularly aligned, widened entrance slots 36 and 38, each of which opens into a respective guide track 32 and 34. FIG. 6 clearly illustrates the over/under relationship of the side rail pairs 28 and 30, guide track pairs 32 and 34, and slot pairs 36 and 38 that allows cage 16 to be by pass molded. As shown in FIG. 5, the slots 36 and 38 are also each spaced back from the inner surface of the journal block 24 by a predetermined distance X, for a purpose described below.

Referring next to FIGS. 7 through 10, each roller control car 22 is molded in a basic box shape of a material similar to cage 16 with an axial width that allows it to fit slidably between the inner surfaces of a pair of side rails 28 and 30. Each car 22 is made up of a pair of parallel front and rear cross members, 40 and 42, joined by a pair of upper and lower side flanges, 44 and 46 respectively. The side flanges 44 and 46 extend out axially beyond the inner surfaces of the cage side rails 28 and 30. Car 22 has the same basic over/under configuration as the pockets of cage 16, and can be by pass molded, also. Car 22 is the right size to contain a roller 18 closely, closely enough to retain it against fall out. If molded of a plastic similar to cage 16, car 22 is very light, insignificant in weight relative to the roller 18. Car 22 is also molded with a pair of upper and lower, axially opposed guide tabs, 48 and 50, which also extend out axially beyond the inner surfaces of the cage side rail pairs 28 and 30. Upper guide tab 48 overhangs lower side flange 46 and is spaced therefrom by just slightly more than the radial thickness of cage upper side rail 28. Lower guide tab 50 extends axially out from the opposite side of front cross member 40, overhanging upper side flange 48. Each guide tab pair 48 and 50 is axially separated by approximately the same distance as the axial separation of a pair of guide tracks 32 and 34, but by less than the axial separation of a pair of entrance slots 36 and 38. Each guide tab 48 and 50 is also sized so as to be able to fit with clearance through a respective entrance slot 36 and 38, and sloped so as to match the chamfer of a respective guide track 32 and 34. Each pair of guide tabs 48 and 50 is also set back from the car front cross member 40 by approximately the same distance as the slot distance X.

Referring next to FIGS. 11 through 14, it may be seen how cooperation between the structural features of cage side rails 28 and 30 and the cars 22 allows the cars 22 to be easily assembled to cage 16. As best seen in FIG. 11, after a roller 18 has been popped into each car 22, each car 22 can then be fitted between a pair of side rails 28 and 30 by first aligning the car guide tabs 48 and 50 with the side rail entrance slots 36 and 38 respectively. Then, car 22 is held at an angle so that its upper side flange 44 can be placed over cage lower side rail 30 and its lower guide tab 50 aligned with lower guide track 34. Then, car 22 is rotated up to bring its upper guide tab through entrance slot 36, FIG. 12. Finally, car 22 is brought fully horizontal, until upper guide tab 48 is radially aligned with upper guide track 32. Although car 22 cannot be moved straight in between the side rails 28 and 30, there is no snap fit of the upper guide tab 50 over the upper side rail 28, since upper guide tab 48 moves freely through upper entrance slot 36. At the FIG. 13 position of car 22 relative to the cage side rails 28 and 30, which may be called the entrance position, the car upper and lower side flanges 44 and 46 both axially overlap the cage lower and upper side rails 30 and 28 respectively, in diagonal fashion. FIG. 14 better shows the relation of guide tabs 48 and 50 and entrance slots 38 and 38 at this point. Car 22 would fall out from between the side rails 28 and 30 if it were released from the entrance position, and is not yet retained to cage 16.

Next, as shown in FIG. 14, car 22 is shifted back from its entrance position far enough to move the guide tabs 48 and 50 out of the entrance slots 36 and 38, to what may be termed an interference position. The guide tabs 48 and 50 slide back into and over the respective guide tracks 32 and 34. By taking advantage of the by pass molding technique with which both the car 22 and cage 16 are molded, the cage upper side rail 28 can be, in effect, slidably captured between the car upper guide tab 48 and lower side flange 46. The same basic relation applies to the cage lower side rail 30, car lower guide tab 50, and car upper side flange 44, although the lower guide track 30 is not exactly coextensive with the lower edge of the cage lower side rail 30. If car 22 can be kept in the interference position, it will stay with cage 16. That is, if car 22 is forced radially inwardly, then the car upper side flange 44 hits the cage lower side rail 30 and the car upper guide tab 48 hits the cage upper guide track 32. Conversely, if car 22 is forced radially outwardly, then the car lower side flange 46 hits the cage upper side rail 28 and the car lower guide tab 50 hits the cage lower guide track 34. The interference position of car 22 and side rails 28 and 30 need not be precisely maintained. Just so long as the guide tabs 48 and 50 are kept out of the entrance slots 36 and 38, the guide tabs 48 and 50 may be located anywhere over their respective guide tracks 32 and 34. The cage cross bar 26 prevents them from exiting in the other direction. This may be contrasted with the assembly step where releasable latch members on a car and cage are snapped together, which requires rather precise positioning, as well as some force. Shifting car 22 back to the interference position requires essentially no force. Cooperation with spring 20 allows each car 22 to be easily and securely maintained at its interference position, as is described next.

Referring next to FIGS. 16 and 17, the final step in the assembly process is to install a spring 20 between each journal block 24 and the front cross member 40 of each roller car 22. During clutch operation, the journal blocks 24 also serve as spring foundation members, against which the rear of each spring 20 reacts. The car front cross members 40 serve as biasing surfaces for the front of the springs 20. The springs 20 do not act directly on the rollers 18, but since the rollers are contained so closely in the roller cars 22, the biasing action of each spring 20 is substantially unaffected during clutch operation. Each spring 20 has a crush length, sometimes called its solid height, beyond which it cannot be compressed without causing permanent deformation, indicated at Y in FIG. 16. At the crush length, all the leaves in contact and cannot be resiliently compressed farther. The threshold crush force necessary to compress spring 20 beyond Y rises steeply, even for a spring 20 that is not particularly resilient, and will be far greater than the disturbing forces that a roller 18 is ever likely to see during ordinary shipping and handling. FIG. 17 shows the relative position of car 22 and cage side rails 28 and 30 at which the guide tabs 48 and 50 would just start to reach the entrance slots 36 and 38. X is deliberately chosen to be less than Y, so the guide tabs 48 and 50 cannot move beyond the FIG. 17 position to reach the entrance slots 36 and 38. The cars 22 and rollers 18 remain securely retained to cage 16. So, while the springs 20 are necessary for secure shipping retention, resilience is irrelevant, and they may be absolutely conventional in terms of shape, size and general operation. During the installation of pathway race 14, there will be no latches to release, and the sound and feel of the ringing in operation will be totally unaffected. After installation, during normal clutch operation, car 22 can slide back and forth between side rails 28 and 30 as roller 18 travels. Car 22 receives circumferential guidance from the guide tabs 48 and 50 riding in the guide tracks 32 ad 34, but does not bind. All the operational benefits that accrue to the roller 18 from a roller control car in general, in terms of skew and spin control, can be had with no interference from the guide tabs 48 and 50, even though the retention scheme of the invention is not deactivated at installation, as is a releasable latch.

Variations of the preferred embodiment disclosed may be made, while still achieving the same basic result. Only one entrance slot would be needed in the car 22 were always installed from the direction shown. For example, only the upper entrance slot 36 could be needed if car 22 were always installed from below. The provision of the lower entrance slot 34 as well allows car 22 to be installed in either direction. Most broadly, only one guide track on cage 16 and one guide member on car 22 to fit slidably into the guide track could be enough to give retention, if there were enough interference and overlap. For example, in the embodiment disclosed, if there were enough overlap of the car's upper guide tab 48 and lower side flange 46 with the cage upper side rail 28, then the cage lower guide track 34 and the car's upper side flange 44 and lower guide tab 50 would be theoretically unnecessary. Nor would a discrete localized entrance slot, like 36 or 38, be absolutely necessary, so long as the guide track or tracks had a localized widened entrance area that would admit the car guide member, and which was closer to the spring foundation member than the crush length of the spring. A pair of closed, two sided guide tracks that were directly axially opposite to one another could be molded into a one piece cage, although it would not be possible to by pass mold such a design. A pair of car guide members riding in axially opposed, two sided tracks would give very secure retention. However, the embodiment disclosed, where the cage 16 and car 22 are both by pass molded, lends itself extremely well to the retention scheme of the invention. The cage side rail-car side flange overlap cooperates with the guide tabs 48 and 50 to give retention that is as secure as a pair of closed guide tracks would give, but much easier to mold in one piece. In fact, given sufficient radial clearance between the lower inside edge of the cage lower side rail 30 and the cam race 12, and sufficient radial clearance between the upper inside edge of the upper cage side rail 28 and the pathway race 14, the inside edges of the side rails 28 and 30 would not even have to be chamfered in order to provide guide tracks for the guide tabs 48 and 50, which could just ride directly over them. Since the side rails 28 and 30 are each generally arcuate, each has at least one edge that lies generally along the travel path of a roller 18, as the guide track should. Only a widened entrance area of some sort in one of the side rails to allow one of the guide tabs to move over the edge of that side rail would be needed. Therefore, it will be understood that it is not intended to limit the invention to just the embodiment disclosed.

The embodiments of the invention in which an exclusive property or privilege is claimed are defined as follows:

1. An overrunning roller clutch of the type that is adapted to be installed between a cam race and a substantially coaxially disposed pathway race, said clutch comprising, a plurality of rollers, each of which moves circumferentially back and forth between said races over a travel path during clutch operation, a plurality of roller energizing springs, each of which is adapted to expand and compress so as to provide a continual bias to a respective roller as it travels to maintain said roller at a lock up ready position between said races, each of said springs also having a crush length beyond which it cannot be compressed without exceeding a spring crush force that is greater than the disturbing forces a roller will experience during normal shipping and handling, a cage adapted to be installed non-turnably to said cam race, said cage including a plurality of axially disposed spring foundation members from which said springs can act as they bias said rollers and at least one guide track disposed generally along said roller travel path, said guide track further including a localized widened entry area spaced from said spring foundation member by a predetermined distance that is less than said spring crush length, and, a plurality of roller control cars, each of which retains a roller, and each of which has a spring biasing surface that faces a respective cage spring foundation member and a guide member sized so as to fit slidably in said guide track and to fit with clearance through said localized widened area, said guide member further being spaced from said spring biasing surface by substantially said predetermined distance, whereby, said clutch is assembled by fitting a guide member of each car through each of said track localized widened areas and then sliding said guide member into said guide track, after which a respective energizing spring may be assembled between each cage foundation member and its respective car spring biasing surface, thereby preventing said guide members from moving back into said widened entry area and retaining said cars and rollers to said cage as a unit.

2. An overrunning roller clutch of the type that is adapted to be installed between a cam race and a substantially coaxially disposed pathway race, said clutch comprising, a plurality of rollers, each of which moves circumferentially back and forth between said races over a travel path during clutch operation, a plurality of roller energizing springs, each of which is adapted to expand and compress so as to provide a continual bias to a respective roller as it travels to maintain said roller at a lock up ready position between said races, each of said springs also having a crush length beyond which it cannot be compressed without exceeding a spring crush force that is greater than the disturbing forces a roller will experience during normal shipping and handling, a cage adapted to be installed non-turnably to said cam race, said cage including a plurality of axially disposed spring foundation members from which said springs can act as they bias said rollers and a plurality of pairs of parallel side rails, each pair extending circumferentially from a respective spring foundation member, each pair of side rails further comprising a pair of guide tracks disposed generally along said roller travel path and a pair of axially opposed entrance slots opening into said guide tracks and spaced from said spring foundation member by a slot distance that is less than said spring crush length, and, a plurality of roller control cars, each of which retains a roller and is sized to move freely back and forth between a pair of side rails as said roller travels, each of said cars also having a spring biasing surface that faces a respective cage spring foundation member and a pair of axially opposed guide tabs sized so as to fit slidably within said side rail guide tracks and to fit with clearance within said side rail clearance slots, said guide tabs further being spaced from said spring biasing surface by substantially said slot distance, whereby, said clutch is assembled by fitting the guide tabs of each of said cars into the entrance slots of a respective pair of cage side rails and then sliding said guide tabs into said side rail guide tracks, after which a respective energizing spring may be assembled between each cage foundation member and its respective car spring biasing surface, thereby preventing said guide tabs from moving back into said entrance slots and retaining said cars and rollers to said cage as a unit.

3. An overrunning roller clutch of the type that is adapted to be installed between a cam race and a substantially coaxially disposed pathway race, said clutch comprising, a plurality of rollers, each of which moves circumferentially back and forth between said races over a travel path during clutch operation, a plurality of roller energizing springs, each of which is adapted to expand and compress so as to provide a continual bias to a respective roller as it travels to maintain said roller at a look up ready position between said races, each of said springs also having a crush length beyond which it cannot be compressed without exceeding a spring crush force that is greater than the disturbing forces a roller will experience during normal shipping and handling, a cage adapted to be installed non-turnably to said cam race, said cage including a plurality of axially disposed spring foundation members from which said springs can act as they bias said rollers and a plurality of pairs of parallel upper and lower side rails the inner surfaces of which are axially spaced by approximately the length of a roller, with each side rail of said pairs extending circumferentially from a respective spring foundation member and at least one of said side rails of each pair being disposed generally along said roller travel path and further having an entrance slot opening through the inside surface thereof and spaced from said spring foundation member by a slot distance that is less than said spring crush length, and, a plurality of roller control cars, each of which retains a roller and is sized to slide freely back and forth between the inner surfaces of said cage side rail pairs as said roller travels, each of said cars also having at least one side flange adapted to be axially overlapped with said one cage side rail and a guide tab radially spaced from said side flange by approximately the radial thickness of said one cage side rail, said guide tab further being sized to fit through said one side rail entrance slot and spaced from said spring biasing surface by substantially said slot distance, whereby, each car is assembled to said cage by overlapping said one cage side rail and car side flange while simultaneously moving said one guide tab through said entrance slot, and then sliding said car back so as to capture said one cage side rail between said overlapping side flange and said guide tab, after which an energizing spring may be assembled between each cage foundation member and its facing car spring biasing surface, thereby preventing said guide tab from moving back into said entrance slot and retaining said car and roller to said cage as a unit.

* * * * *